UNITED STATES PATENT OFFICE.

JOSEPH TURNER AND HARRY DEAN, OF HUDDERSFIELD, ENGLAND.

BLACK COLORING-MATTERS.

1,028,306.

Specification of Letters Patent.

Patented June 4, 1912.

No Drawing. Application filed September 21, 1911. Serial No. 650,571.

*To all whom it may concern:*

Be it known that we, JOSEPH TURNER and HARRY DEAN, subjects of King George V of Great Britain, residing at Huddersfield, in the county of York, England, have invented certain new and useful Improvements in the Manufacture of Black Coloring-Matters, of which the following is a specification.

This invention relates to the manufacture of direct cotton dyestuffs, in investigating which we have found that the use of certain chlor derivates of aromatic amins yield valuable black dyestuffs.

In the production of direct dyeing cotton dyestuffs according to our invention, we combine one molecule of the neutral salt of amido-naphthol-dusulfonic acid (1.8.3.6) (H acid) with one molecule of tetrazotized benzidin, taking care that throughout the reaction a slight excess of mineral acid remains present. When the combination is completed, the intermediate product is rendered alkaline with sodium carbonate and a diazo solution from one molecule of ortho or para chlor anilin is run in. A deep blue black body forms at once and is complete when all diazo-chlor-benzene has disappeared. There is then further added one molecule of meta-phenylene-diamin 1:2:4 or meta-toluylene-diamin.

As an example of the production of the coloring matter, we give the following: 184 parts of benzidin are tetrazotized in the well known manner, and are combined with a neutral solution prepared from 341 parts of the acid sodium salt of amido-naphthol-disulfonic acid (1.8.3.6) (H acid). When the combination is complete, the mixture is made alkaline with sodium carbonate, and a solution of para-chlor-diazo-benzene from 128 parts of para chlor anilin is quickly added. The intermediate product which forms almost immediately is then further combined with a solution of 143 parts of meta-phenylene-diamin 1:2:4, or meta-toluylene-diamin. The dyestuff is isolated in the usual manner, and it dyes vegetable fibers fine deep black shades.

We may replace the benzidin in the above example by other para diamins, such as tolidin or dianisidin.

The dyestuff produced by this process is soluble in concentrated sulfuric acid with a reddish blue black color; it is soluble in water with a violet black color; and the dyestuff yields on reduction with stannous chlorid and hydrocloric acid the following products:—di-amido H acid, *i. e.*, tri-amido-naphthol-disulfo acid, benzidin, tri-amido-benzene and chlor-anilin. The dyestuff is a polyazo compound, and its exact structural formula is uncertain.

What we claim is:

1. A process for manufacturing a dyestuff, which consists in combining a tetrazotized para-diamin with one molecular proportion of amido-naphthol-disulfonic acid (1.8.3.6) (H acid) in slightly mineral acid solution, then combining the intermediate body thus formed with one molecular proportion of a diazo-chlo-benzene, and finally adding one molecule of a meta-diamin.

2. A process for manufacturing a dyestuff, which consists in combining tetrazotized benzidin with one molecular proportion of amido-naphthol-disulfonic acid (1.8.3.6) (H acid) in slightly mineral acid solution, then combining the intermediate body thus formed with one molecular proportion of a diazo-chlor-benzene, and finally adding one molecule of a meta-diamin.

In testimony whereof we affix our signatures in the presence of two witnesses.

JOSEPH TURNER.
HARRY DEAN.

Witnesses:
FREDERICK I. BRIGHT,
THOMAS H. BARRON.

Copies of this patent may be obtained for five cents each, by addressing the "Commissioner of Patents, Washington, D. C."